US009619297B2

(12) United States Patent
Jain et al.

(10) Patent No.: US 9,619,297 B2
(45) Date of Patent: Apr. 11, 2017

(54) PROCESS MIGRATION IN DATA CENTER NETWORKS

(75) Inventors: Navendu Jain, Seattle, WA (US); Ishai Menache, Redmond, WA (US); F. Bruce Shepherd, Medina, WA (US); Joseph (Seffi) Naor, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 815 days.

(21) Appl. No.: 13/531,612

(22) Filed: Jun. 25, 2012

(65) Prior Publication Data

US 2013/0346572 A1 Dec. 26, 2013

(51) Int. Cl.

| | |
|---|---|
| ***G06F 9/50*** | (2006.01) |
| ***G06F 9/48*** | (2006.01) |
| ***G06F 15/173*** | (2006.01) |
| ***G06F 9/455*** | (2006.01) |

(52) U.S. Cl.

CPC .......... *G06F 9/5088* (2013.01); *G06F 9/4856* (2013.01); *Y02B 60/162* (2013.01)

(58) Field of Classification Search

CPC .. G06F 9/4856; G06F 9/5088; G06F 9/45558; H04L 65/80; H04L 47/10; Y02B 60/162

USPC .............. 709/223, 226, 231; 370/235; 718/1

See application file for complete search history.

(56) References Cited

U.S. PATENT DOCUMENTS 6,374,227 B1 * 4/2002 Ye .......................... G06Q 10/04 705/7.25
7,480,773 B1 * 1/2009 Reed ..................... G06F 9/5016 711/153
9,098,214 B1 * 8/2015 Vincent ..................... G06F 8/10
2002/0138643 A1 * 9/2002 Shin et al. .................... 709/232
2004/0133504 A1 * 7/2004 Dalal ..................... G06Q 10/04 705/37
2010/0027420 A1 * 2/2010 Smith .................. G06F 9/4856 370/235
2010/0146136 A1 * 6/2010 Lou et al. .................... 709/231
2010/0257269 A1 * 10/2010 Clark ........................... 709/226

(Continued)

OTHER PUBLICATIONS

Shrivastava, et al., “Application-aware Virtual Machine Migration in Data Centers”, Retrieved at <<http://ieeexplore.ieee.org/stamp/stamp.jsp?tp=&arnumber=5935247>>, Proceedings of IEEE INFOCOM, Shanghai, China, Apr. 11,2011, pp. 66-70.

(Continued)

*Primary Examiner* — David Lazaro
*Assistant Examiner* — Zi Ye
(74) *Attorney, Agent, or Firm* — International IP Law Group, PLLC

(57) ABSTRACT

There is provided a method and system for process migration in a data center network. The method includes selecting processes to be migrated from a number of overloaded servers within a data center network based on an overload status of each overloaded server. Additionally, the method includes selecting, for each selected process, one of a number of underloaded servers to which to migrate the selected process based on an underload status of each underloaded server, and based on a parameter of a network component by which the selected process is to be migrated. The method also includes migrating each selected process to the selected underloaded server such that a migration finishes within a specified budget.

16 Claims, 6 Drawing Sheets

114 NETWORK
118 CLIENT COMPUTING DEVICES
116
102
112 112
110 110
108 108
106 • • • 106 106 • • • 106
104 104 • • • 104 104 • • • 104 104
100

(56) References Cited

U.S. PATENT DOCUMENTS

| | | | |
|---|---|---|---|
| 2011/0019531 A1 | 1/2011 | Kim et al. | |
| 2011/0239215 A1* | 9/2011 | Sugai | G06F 9/45558 718/1 |
| 2012/0011254 A1 | 1/2012 | Jamjoom et al. | |
| 2013/0290537 A1* | 10/2013 | Shaw | 709/226 |

OTHER PUBLICATIONS

Stage, et al., "Network-aware migration control and scheduling of differentiated virtual machine workloads", Retrieved at <<http://ieeexplore.ieee.org/stamp/stamp.jsp?tp=&arnumber=5071527>>, Proceedings of ICSE Workshop on Software Engineering Challenges of Cloud Computing, May 23, 2009, pp. 9-14.

Mann, et al., "VMFIow: Leveraging VM Mobility to Reduce Network Power Costs in Data Centers", Retrieved at <<http://domino.research.ibm.com/library/cyberdig.nsf/papers/5D059BE4CFB56C69852577E00047836D/$File/report.pdf>>, Nov. 19, 2010, pp. 1-11.

"Virtual Machine Mobility with Vmware VMotion and Cisco Data Center Interconnect Technologies", Retrieved at <<http://www.cisco.com/en/US/solutions/collateral/ns340/ns517/ns224/ns836/white_paper_c11-557822.pdf>>, May 20, 2010, pp. 1-17.

"VMware vSphere™" , Retrieved at <<http://www.vmware.com/products/vmotion/features.html>>, Oct. 5, 2009, pp. 3.

Hyser, et al., "Autonomic Virtual Machine Placement in the Data Center", Retrieved at<<http://www.cse.iitb.ac.in/~anjana/docs/AutonomicVMPlacementinDataCenter.pdf>>, Feb. 26, 2008, pp. 11.

Barroso, et al., "The case for energy-proportional computing", Retrieved at <<http://www.cra.org/ccc/docs/ieee_computer07.pdf>>, Dec. 2007, pp. 33-37.

Buchbinder, et al., "Online job-migration for reducing the electricity bill in the cloud", Retrieved at <<http://hpc.ipm.ac.ir/cloudspms/attachments/49/buchbinder11online.pdf>>, 2011, pp. 14.

Chekuri, et al., "Unsplittable flow in paths and trees and column-restricted packing integer programs", Retrieved at http://www.cs.uiuc.edu/~ene1/papers/ufp-approx.pdf>>,2009, pp. 14.

Chekuri, et al., "The all-or-nothing multicommodity flow problem", Retrieved at http://repository.upenn.edu/cgi/viewcontent.cgi?article=1009&context=cis_papers>>, Proceedings of the thirty-sixth annual ACM symposium on Theory of computing, ACM, Jun. 13, 2004,pp. 156-165.

Chekuri, et al., "Multicommodity demand flow in a tree and packing integer programs", Retrieved at <<http://www.cs.uiuc.edu/homes/chekuri/papers/demandtree.pdf>>,Proceedings of ACM Transactions on Algorithms (TALG), 3(3), Sep. 22, 2006, pp. 20.

Clark, et al., "Live migration of virtual machines", Retrieved at <<http://www.cl.cam.ac.uk/research/srg/netos/papers/2005-migration-nsdi-pre.pdf>>, Proceedings of NSDI, 2005, pp. 14.

Elmoroth, et al., "Interfaces for placement, migration, and monitoring of virtual machines in federated clouds", Retrieved at http://ieeexplorejeee.org/stamp/stamp.jsp?tp=&arnumber=5279590>>, Proceedings of 2009 Eighth International Conference on Grid and Cooperative Computing, 2009, pp. 253-260.

Greenberg, et al., "VI2: a scalable and flexible data center network", Retrieved at <<http://research.microsoft.com/pubs/80693/vl2-sigcomm09-final.pdf>>, Proceedings of SIGCOMM, Aug. 17-21, 2009, pp. 12.

Greenberg, et al., "Towards a next generation data center architecture: scalability and commoditization", Retrieved at http://networks.cs.ucdavis.edu/~mukherje/289i_sq10/3-greenberg-presto08.pdf>>, in Proceedings of the ACM workshop on Programmable routers for extensible services of tomorrow, Aug. 22, 2008, pp. 57-62.

Balter-Harchol, et al., "Exploiting process lifetime distributions for dynamic load balancing", Retrieved at <<http://www.ics.forth.gr/mobile/Bibliography/LoadBalancing/LB/Exploit_Life_Distributions_LB.pdf>>, Proceedings of ACM Transactions on Computer Systems (TOCS), 15(3), 1997, pp. 253-285.

Hines, et al., "Post-copy based live virtual machine migration using adaptive pre-paging and dynamic self-ballooning", Retrieved at http://citeseerx.ist.psu.edu/viewdoc/download?doi=10.1.1.184.2368&rep=rep1&type=pdf>., Proceedings of VEE, Mar. 11-13, 2009, pp. 10.

Korupolu, et al., "Coupled placement in modern data centers", Retrieved at <<http://www.aameeksingh.com/projects/coupled-ipdps09.pdf>>, Proccedings of IPDPS, 2009, pp. 12.

Cavilla- Lagar, et al., "Snowflock: Rapid virtual machine cloning for cloud computing", Retrieved at <<http://lagarcavilla.org/publications/LagarCavillaEurosys09.pdf>>, Proceedings of Eurosys, 2009, pp. 12.

Lee, et al., "Validating heuristics for virtual machines consolidation", Retrieved at <<http://research.microsoft.com/pubs/144571/virtualization.pdf>>, pp. 14.

Liu, et al., "Geographical load balancing with renewables", Retrieved at http://www.sigmetrics.org/sigmetrics2011/greenmetrics/green11_Liu_1569454849.pdf>>, Proceedings of ACM Greenmetrics, 2011, pp. 5.

Qureshi, et al., "Cutting the electric bill for internet-scale systems", Retrieved at <<http://www.akamai.com/dl/technical_publications/qureshi_09.pdf>>, Proceedings of the ACM SIGCOMM 2009 conference on Data communication, Aug. 17-21, 2009, pp. 123-134.

Sapuntzakis, et al., "Optimizing the migration of virtual computers", Retrieved at <<http://citeseerx.ist.psu.edu/viewdoc/download?doi=10.1.1.20.3101&rep=rep1&type=pdf>>, Proceedings of OSDI, 2002, pp. 14.

Shepherd, et al., "The demand-matching problem", Retrieved at <<http://mor.journal.informs.org/content/32/3/563.full.pdf>>, Proceedings of Mathematics of Operations Research, vol. 32, No. 3, Aug. 2007, pp. 563-578.

Shmoys, et al., "An approximation algorithm for the generalized assignment problem", Retrieved at <<http://www.columbia.edu/~cs2035/courses/ieor6400.F07/st.pdf>>, Proceedings of Mathematical Programming, 62(1), 1993, pp. 461-474.

Sundararaj, et al., "An optimization problem in adaptive virtual environments", Retrieved at <<http://virtuoso.cs.northwestern.edu/mama05.pdf>>, Proceedings of ACM SIGMETRICS Performance Evaluation Review, 33(2):6-8,2005, pp. 4.

Voorsluys, et al., "Cost of virtual machine live migration in clouds: A performance evaluation", Retrieved at <<http://www.cloudbus.org/reports/VM-Migration-Cloud2009.pdf>>, Proceedings of CloudCom, 2009, pp. 12.

Wood, et al., "Cloudnet: A platform for optimized wan migration of virtual machines", Retrieved at <<http://www.cs.umass.edu/~twood/pubs/cloudnet-tr.pdf>>, University of Massachusetts Technical Report TR-2010, 2, 2010, pp. 1-15.

Wood, et al., "Black-box and gray-box strategies for virtual machine migration", Retrieved at <<http://www.cs.umass.edu/~twood/pubs/NSDI07.pdf>>, Proceedings of NSDI, 2007, pp. 14.

Wu, et al., "Performance modeling of virtual machine live migration", Retrieved at <<http://ieeexplore.ieee.org/stamp/stamp.jsp?tp=&arnumber=6008747>>, Proceedings of IEEE CLOUD, 2011, pp. 492-499.

Xu, et al., "Egalitarian stable matching for vm migration in cloud computing", Retrieved at <<http://iqua.ece.toronto.edu/~bli/papers/hxu-cloud11.pdf>>, Proceedings of Computer Communications Workshops (INFOCOM WKSHPS), 2011, pp. 631-636.

Xu, et al., "Virtual machine migration strategy in federated cloud", Retrieved at <<http://www.internetconference.org/ic2010/PDF/ic2010-session-1-2.pdf>>, In IC, 2010, pp. 7.

* cited by examiner

100

200

500

PROCESS MIGRATION IN DATA CENTER NETWORKS

BACKGROUND

Virtual machine (VM) technology has emerged as a building block for cloud computing. The idea is to provide a layer of abstraction over resources of a physical server and multiplex the layers of abstraction among processes running on the physical server. Virtualization provides several benefits, such as performance isolation, security, ease of management, and flexibility of running applications in a user-customized environment.

Within a cloud computing environment, the VM load may fluctuate under dynamic conditions caused by factors such as incremental growth in workload, time-of-day effects, and increases in network traffic. This may result in the creation of hotspots, which are resources within the cloud computing environment that are backlogged due to an excessive number of transactions, for example. Such hotspots may degrade the quality of service (QoS) of hosted applications by causing longer response times and lower throughputs. Therefore, to allow for runtime load balancing, cloud computing platforms may provide live migration of application processes. Live migration involves transparently moving an entire VM, including its memory state, processor registers, operating system (OS), and applications, from an overloaded server to an underloaded server with relatively low downtime. The ability to move processes with relatively low downtime may be useful for a variety of applications, such as applications for hosting live, interactive services. Thus, automated VM management represents a new opportunity to enable agile and dynamic resource management in data centers networks. Currently, several techniques are available for live migration. However, such techniques fail to address several control issues, as discussed further below.

SUMMARY

The following presents a simplified summary of the subject innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

An embodiment provides a method for process migration in a data center network. The method includes selecting processes to be migrated from a number of overloaded servers within a data center network based on an overload status of each overloaded server and selecting, for each selected process, one of a number of underloaded servers to which to migrate the selected process based on an underload status of each underloaded server, and based on a parameter of a network component by which the selected process is to be migrated. The method also includes migrating each selected process to the selected underloaded server such that a migration finishes within a specified budget.

Another embodiment provides a system for process migration. The system includes a data center network including a number of servers, wherein the servers include overloaded servers and underloaded servers. The system includes a client computing device communicatively coupled to the data center network. The client computing device includes a processor that is adapted to execute stored instructions and a system memory. The system memory includes code configured to select processes to be migrated from any of the overloaded servers based on an overload status of each overloaded server and select, for each selected process, an underloaded server to which to migrate the selected process based on an underload status of each underloaded server, and based on available resources and constraints in the data center network. In addition, the data center network is configured to migrate each selected process to a selected underloaded server in response to an input from the client computing device.

In addition, another embodiment provides one or more computer-readable storage media for storing computer-readable instructions. The computer-readable instructions provide a system for migrating processes when executed by one or more processing devices. The computer-readable instructions include code configured to select a process to be migrated from an overloaded server within a data center network, wherein the overloaded server is chosen from a number of overloaded servers based on an excess capacity of the overloaded server. The computer-readable instructions also include code configured to select an underloaded server within the data center network to which to migrate the selected process, wherein the underloaded server is chosen from a number of underloaded servers based on a free capacity of the underloaded server and a network distance between the underloaded server and the overloaded server. Further, the computer-readable instructions include code configured to migrate the selected process from the overloaded server to the underloaded server.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

As discussed above, cloud computing platforms often provide live migration to allow for runtime load balancing within data center networks. Live migration involves transparently moving an entire virtual machine (VM), including its memory state, processor registers, operating system (OS), and applications, from an overloaded server to an underloaded server with relatively low downtime. However, current techniques fail to consider several control issues. For example, current techniques fail to consider the underlying network topology connecting multiple servers. In addition, current techniques assume that VMs have already been assigned for migration and ignore the capacity constraints of the network connecting the servers. In other words, current techniques do not provide a method for determining which VMs to migrate from overloaded servers, or a method for determining the underloaded servers to which the VMs are to be migrated in a bandwidth-oversubscribed data center network. Further, such techniques do not provide for the specification of a budget for the VM migration procedure. In many cases, these shortcomings result in high migration costs for migrating VMs.

Embodiments described herein set forth a method and system for process migration within a data center network. The process migration procedure is described herein as relating to the migration of VMs. However, it is to be understood that the process migration procedure may also be used to migrate any other type of process.

The VM migration procedure described herein may be performed such that a number of hotspots are alleviated within the data center network, without exceeding a specified budget. The specified budget may be, for example, a temporal budget or a bandwidth budget. In addition, the specified budget may be a specified absolute total number of processes for migration, or a specified maximum number of processes that can be migrated from each overloaded server, or to each underloaded server. The VM migration procedure may include leveraging the cloud monitoring infrastructure to gather resource usage statistics on VMs and servers as well as on network resources such as link capacity and delays. In addition, the VM migration procedure may include performing hotspot detection for determining specific VMs to migrate from overloaded servers, and specific underloaded servers to which the VMs are to be migrated. In various embodiments, the VM migration procedure may be used to alleviate single server hotspots, as well as multi-server hotspots, while scaling for data center networks.

Data Center Network

Figure 1:
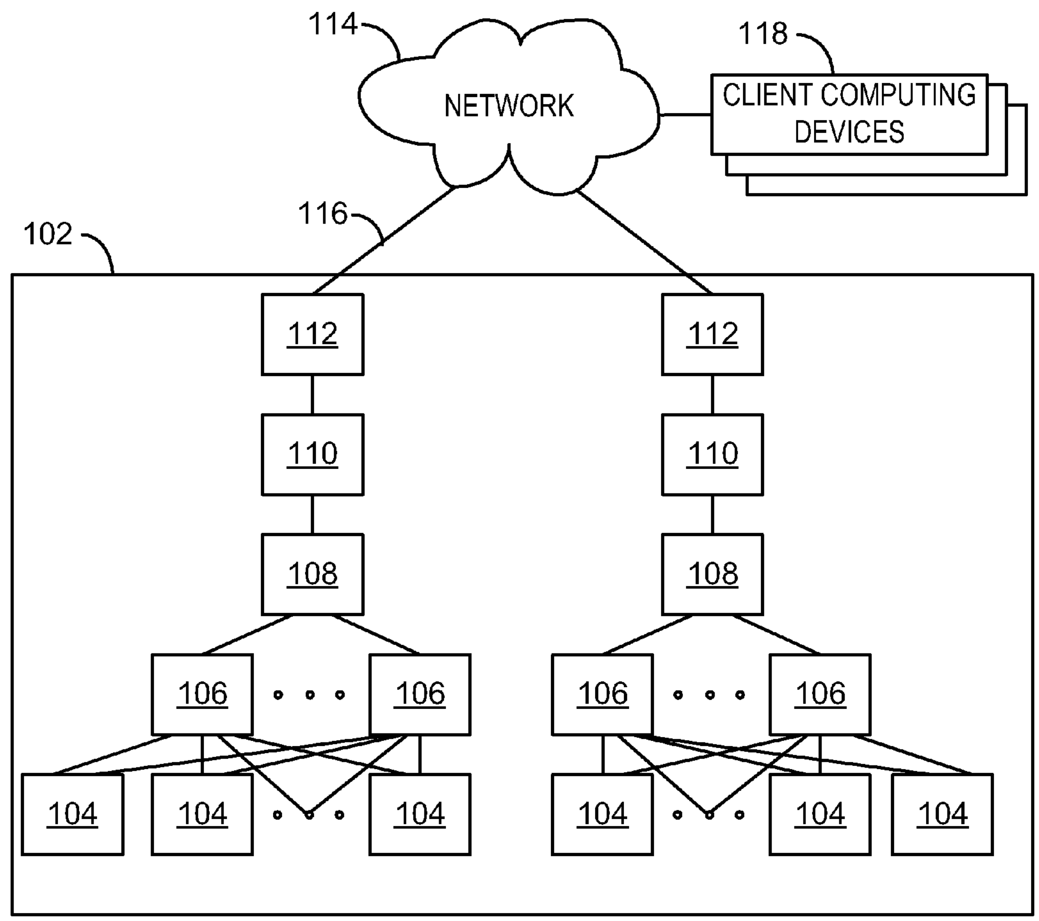
FIG. 1 is a block diagram of a data center network in accordance with the claimed subject matter.

FIG. 1 is a block diagram 100 of a data center network 102 in accordance with the claimed subject matter. The data center network 102 may be used to connect, or "dual-homed," a number of rack-mounted servers 104 to a number of Top of Rack (ToR) switches 106. In addition, the ToR switches 106 may be connected to a number of aggregation switches 108. The aggregation switches 108 may be used to combine network traffic from the ToR switches 106, and forward such network traffic to a number of access routers 110. The access routers 110 may be used to aggregate network traffic from a number of servers 104, e.g., on the order of several thousand servers, and route the network traffic to a number of core routers 112. The core routers 112 may be configured to communicatively couple the data center network 102 to a network 114. The network 114 may be, for example, a wide area network (WAN), local area network (LAN), or the Internet.

The components of the data center network 102 discussed above may be connected by a number of network links 116. The network links 116 may be wired or wireless connections. In some embodiments, the network links 116 use Ethernet as the link layer protocol. The physical connections for the network links 116 may be a mixture of copper and fiber cables. Additionally, in some embodiments, the servers may be partitioned into virtual LANs (VLANs) to limit overheads, and to isolate different applications that are hosted in the data center network 102.

The data center network 102 may be organized in a multi-rooted spanning tree topology, as shown in FIG. 1. The tree is denoted by $T=(V,\epsilon)$ where V denotes the nodes, and the network links, or edges, are denoted by $e\in\epsilon$. The capacity of each network link 116 is denoted by $c_e$, which is typically measured in units of bits per unit time. Further, in some embodiments, the network links 116 within the spanning tree are undirected, e.g., bidirectional. However, in other embodiments, the network links 116 are directed, e.g., unidirectional.

As a result of the spanning tree topology, there may be a unique path between each pair of servers 104. For example, the data center network 102 may have a 1:1 redundancy of devices and links. However, at any point in time, the number of active paths for routing data from a server is typically limited to one.

For data center networks 102 organized in a spanning tree topology, the network distance between multiple servers 104 may vary. As a result, there may be differences in bandwidth connectivity between different servers 104. For example, two servers 104 in the same rack or cluster may have higher bandwidth connectivity than two servers 104 in different racks or clusters. Thus, the proximity, e.g., the network proximity of one server 104 to another server 104 affects the data migration costs of moving data between the two servers 104. Accordingly, the VM migration procedure may be applied on a rack by rack basis, since VM migration between servers 104 within the same rack is preferable over VM migration between servers across racks.

The data center network 102 may be communicably coupled to any number of client computing devices 118 via the network 114. The client computing devices 118 may include mobile phones, tablets, desktop computers, laptop computers, electronic readers, televisions, or media players, among others. The client computing devices 118 may be used to initiate I/O requests, wherein the I/O requests may include requests to perform read or write operations, or any other types of transactions, within the data center network 102. Therefore, in general, the client computing devices 118 may include any type of computing device which is capable of initiating such I/O requests.

The block diagram 100 of FIG. 1 is not intended to indicate that the data center network 102 is to include all the components shown in FIG. 1. Further, any number of additional components may be included within the data center network 102, depending on the details of the specific implementation. For example, the data center network 102 may also include a number of middle boxes (not shown), such as load balancers and firewalls, for performing a variety of functions. In addition, while the data center network 102 is described with respect to the servers 104 connected via the specific types of network switches and routers 106-112, it is to be understood that the data center network 102 may alternatively include any other suitable types of computing nodes connected via any suitable types of network switches and routers, or organized in a different topology such as Clos networks.

Jobs and Servers

The set of servers 104 within the data center network 102 may be denoted by $\mathcal{K}$. The set $\mathcal{K}$ may be partitioned into hot and cold servers, e.g., $\mathcal{K}=\mathcal{K}_{hot}\cup\mathcal{K}_{cold}$. Each cold server k may include a certain amount of free capacity, denoted by $L_k$. The determination of the value of the free capacity $L_k$ may be made based on a desired capacity limit Exceeding the capacity limit may result in performance degradation of the VMs running on the server 104, as well as hosted applications therein. In contrast, each hot server k may include an excess capacity, also denoted by $L_k$. Thus, VM migration may be performed for the hot servers in order to reduce the load on the servers. Reducing the load on the hot servers may help to ensure appropriate quality of service (QoS) for hosted applications.

In various embodiments, VMs are allocated to the servers 104, with each server 104 typically hosting multiple VMs. The VMs are also referred to herein as jobs. The set of VMs, which may be referred to as the set of subject-to-migration (STM) jobs, is denoted by j=1, . . . , N. Each job j may be characterized by a transfer size denoted by $s_j$, which is typically in the range of 1-30 GB. The transfer sizes for multiple VMs may be assumed to be uniform and, thus, may be normalized to a size of 1 GB. In addition, each VM may be characterized by a computational load denoted by $l_j$, typically measured in CPU units. The load for a server 104 may be defined as the sum aggregate of the computational loads of the VMs hosted on the server 104. Further, each of the VMs may be characterized by a value of migration, $v_j$, which is used to prioritize migration of for VMs of a specific priority. The transfer size, computational load, and value of migration for a VM are independent parameters that may be used for the implementation of the VM migration procedure.

According to embodiments described herein, VMs may be migrated from hot servers to cold servers within the data center network 102. This may be accomplished by specifying a collection of VMs on hot servers within the data center network 102, and determining a target set of cold servers to which the VMs may be migrated. As discussed above, there may be a unique path for the migration of each VM from its source, e.g., a hot server, to its destination, e.g., a cold server. For a collection of VMs to be migrated, the VM migration procedure may be feasible if the sum of the transfer sizes for all of the VMs being migrated at a given time via a particular network link 116 does not exceed the specified available capacity of the network link 116 at that time. For example, a budget may be specified on the network bandwidth used for VM migration.

In various embodiments, the VM migration procedure is governed by a specified budget. The specified budget may be a temporal budget or a bandwidth budget, for example. In addition, the specified budget may be a specified absolute total number of processes for migration, or a specified maximum number of processes that can be migrated from each overloaded server, or to each underloaded server. The specified budget may be determined based on the fraction of the overall capacity of the data center network 102 that can be dedicated to the VM migration procedure. Thus, the VM migration procedure may be executed such that a number of hot servers are mitigated without exceeding the specified budget of the data center network 102. In various embodiments, the VM migration procedure is also governed by capacities for network links 116 by which the virtual machines are to be migrated.

According to embodiments described herein, the VM migration procedure may be performed using a hotspot mitigation algorithm (HMA). More specifically, the HMA may be used to determine specific VMs to migrate from hot servers, as well as specific cold servers to which the VMs are to be migrated. The HMA may iteratively examine hot servers on a rack-by-rack basis. For each rack, the HMA may solve a sub-problem which preferentially attempts to resolve hotspots by migration within the rack, but may also resort to more distant migrations. This rack optimization sub-problem may be solved using a two-phase algorithm.

During the first phase of the algorithm, a first linear programming (LP) relaxation may be used to yield an upper bound on the number of hot servers that can be relieved. The LP relaxation may have variables of the form $x(jk)\in[0,1]$, which model the decision of whether to migrate VM j to a cold server k. An integral solution is one in which all these variables have values of 0 or 1; otherwise, it is a fractional solution. The first LP relaxation outputs the set of VMs to be migrated from hot servers within the rack, and a fractional solution for the migration policy of the VMs on the hot servers to cold servers within the data center network 102.

During the second phase of the algorithm, the solution from the first LP relaxation may be used to produce a second LP relaxation. The second LP relaxation may be defined by a system of totally unimodular constraints, meaning that the second LP relaxation will always have integral or optimal solutions. Thus, the solutions from the second LP relaxation may be used to relieve the hot servers and satisfy network link capacities. In some cases, this may be performed at the expense of exceeding the load constraint at each cold server by a small additive constant. However, this violation can be handled, for instance, by decreasing the load capacity of each server by a constant value. Further, costly migrations to distant cold servers may be penalized, and certain constraints may be imposed on the VM migration procedure. In one embodiment, a client may specify, via one of the client computing devices 118, an explicit list of cold servers to which migration is feasible for a particular VM. This list may be used for VM-specific constraints, or for restricting migrations to a specific network radius.

Relieving a Single Hotspot

Embodiments described herein may be used to relieve a single hotspot on a hot server within the data center network 102. In such embodiments, a set of VMs at a single hot server, h, can be migrated to cold servers, thus aiming to relieve the hot server. This may be accomplished using an approximation algorithm with a small violation in destination load capacities. For example, a LP relaxation may be solved for the migration problem. The solution of the LP relaxation may be a fractional solution having the property that its value, e.g., opt, is an upper bound on the total load of the VMs that can be migrated from h. The VMs may then be migrated integrally, assuming that the total load on destination cold servers can be violated by an additive term of $l_{max}$, wherein $l_{max}=\max_i l_i$. In addition, all VMs may be assumed to have the same size, i.e., for all j, $s_j=1$.

According to the definitions and assumptions described above, relieving a single hotspot on a hot server within the data center network 102 may be accomplished using a two-phase algorithm. First, an LP relaxation may be solved. The LP relaxation solution may be used to produce a second LP relaxation with total unimodularity, which means that all of its basic solutions are integral.

In order to relieve a single hotspot on a hot server h within the data center network 102, the tree T may be rooted at server h, with the edges of the data center network 102 being directed away from h. All other leaves of the tree T may be considered to be cold servers, wherein the set of cold servers is denoted by C. In addition, J may be the set of jobs on the hot server, and T(j) may be the set of possible cold servers for each $j\in J$. The term x(jk) may indicate the fractional amount of migration of job $j\in J$ to server $k\in C$, and the term $z_j=\Sigma_{k\in T(j)}x(jk)$ may indicate the total fractional migration in [0,1] of job $j\in J$.

The phase 1 LP relaxation objective may be defined as shown below in Eq. 1.

$$OPT_{LP1}=\max \Sigma_{j\in J} l_j z_j \quad \text{Eq. 1}$$

The migration constraints may be defined as shown below in Eq. 2.

$$\text{For each job } j: \Sigma_{k\in Dest(j)} x(jk)\leq 1 \quad \text{Eq. 2}$$

The flow constraints may be defined as shown below in Eq. 3.

$$\text{For each edge } e\in T: \Sigma_{jk\in Fund(e)} x(jk)\leq c_e \quad \text{Eq. 3}$$

The load constraints may be defined as shown below in Eq. 4.

$$\text{For each job } k\in C: \Sigma_{j:k\in Dest(j)} x(jk) l_j \leq L_k \quad \text{Eq. 4}$$

Further, a non-negativity condition may be defined as shown below in Eq. 5.

$$x(jk), z_j \geq 0 \quad \text{Eq. 5}$$

Thus, the LP relaxation generates a fractional migration vector ($x^*$,$z^*$), which relieves the hot server. The components of the LP relaxation solution are $x^*(jk)$, which represents how much of job j is migrated to server k, e.g., the flow from j to k, and $z^*_j=\Sigma_k x^*(jk)\leq 1$, which represents the total amount of job j which is migrated. The fact that the hot server is relieved corresponds to having $\Sigma_j l_j z^*_j \geq L = L_h$. In addition, it may be assumed that $x^*$,$z^*$ are given by any LP solver.

The fractional migration problem may be recast as a directed multiflow problem on a tree. This may lead to the phase 2 LP relaxation formulation, which has integral optimal solutions. A new directed tree T* with some extra leaves may be created. First, for each job j, a new job node j is created, and a new leaf edge (j,h) from j to the server node h is added. These edges have a capacity of 1. The set of new job nodes may be denoted by V.

New leaves may be added at each cold server. Specifically, a job-edge graph may be defined, $H=(V_J \cup \mathcal{K}_{cold}, E_{job})$. For each cold server $k\in \mathcal{T}(j)$, a job edge (j,k) is added if job j is partially migrated to k in the fractional solution $x^*$. In this case, if f=(j,k) is such an edge, $l_f$ is used to denote the load $l_i$ of j. Let $E_{job}$ be the resulting set of job edges. These yield the bipartite demand graph.

A feasible, e.g., integral, migration of h's jobs corresponds to choosing $M\subseteq E_{job}$ such that one job edge is chosen incident to each $j\in V_J$, i.e., each job is migrated. In addition, the feasible migration corresponds to choosing $M\subseteq E_{job}$ such that, for each edge $e\subset T$, the number of job edges crossing e does not exceed $c_e$. In other words, the flow of jobs through e does not exceed $c_e$. Further, for each $k\in \mathcal{K}_{cold}$, $\Sigma_{f\in M\cap\delta_H(k)} l_f \leq L_k$, i.e., the load of jobs migrated to k does not exceed $L_k$. The first two constraints are modeled purely as routing constraints within the tree. In other words, if job edges which have a feasible routing in T* are chosen, then the first two constraints hold. The last constraint is different from the first two, since routing a fraction $x^*_{jk}$ of job j to server k induces a load of $l_j x_{jk}$, not $x_{jk}$. The third constraint may be approximately modeled as a flow constraint if some additive server overload is allowed. To do this, T* is expanded with some cold server leaves.

For each cold server k, its fractional degree, f(k), may be defined to be the total flow of jobs being migrated to k. New leaf edges may be created at k: (k, 1), (k, 2), . . . , (k,[f(k)]), each with a capacity of 1. These may be referred to as bucket leaves at k. The job edges of $E_{job}$ terminating at k may be redirected to bucket leaf nodes as follows. Let $f_1, f_2, \ldots, f_p$ be the job edges currently terminating at k, where $f_i=(j_i, k)$. Without loss of generality, assume $l_1\geq l_2\geq \ldots \geq l_p$, and consider the fractional amounts $x^*(j_i k)$ that the LP routed from job $j_i$ to server k. The $f_i$'s may be greedily grouped into [f(k)] buckets as follows. Let s be the smallest value such that $\Sigma_{i=1}^{s} x^*(j_i k)\geq 1$. Then, $f_1, f_2, \ldots, f_s$ may be removed from $E_{job}$, and edges may be added from each $j_i$ to bucket leaf node 1. If the latter sum is strictly larger than 1, two copies of $f_s$ may be made, and the second copy may be redirected to leaf node 2. The buckets $B_1, B_2, \ldots, B_{[f(k)]}$ of job edges may then be made in the inductive fashion. Note that the total fractional weight of job edges into each k-leaf node can be viewed as exactly 1, except for the last bin whose total weight is f(k)−[f(k)]. A pictorial example of this operation is shown below in FIG. 2.

Figure 2:
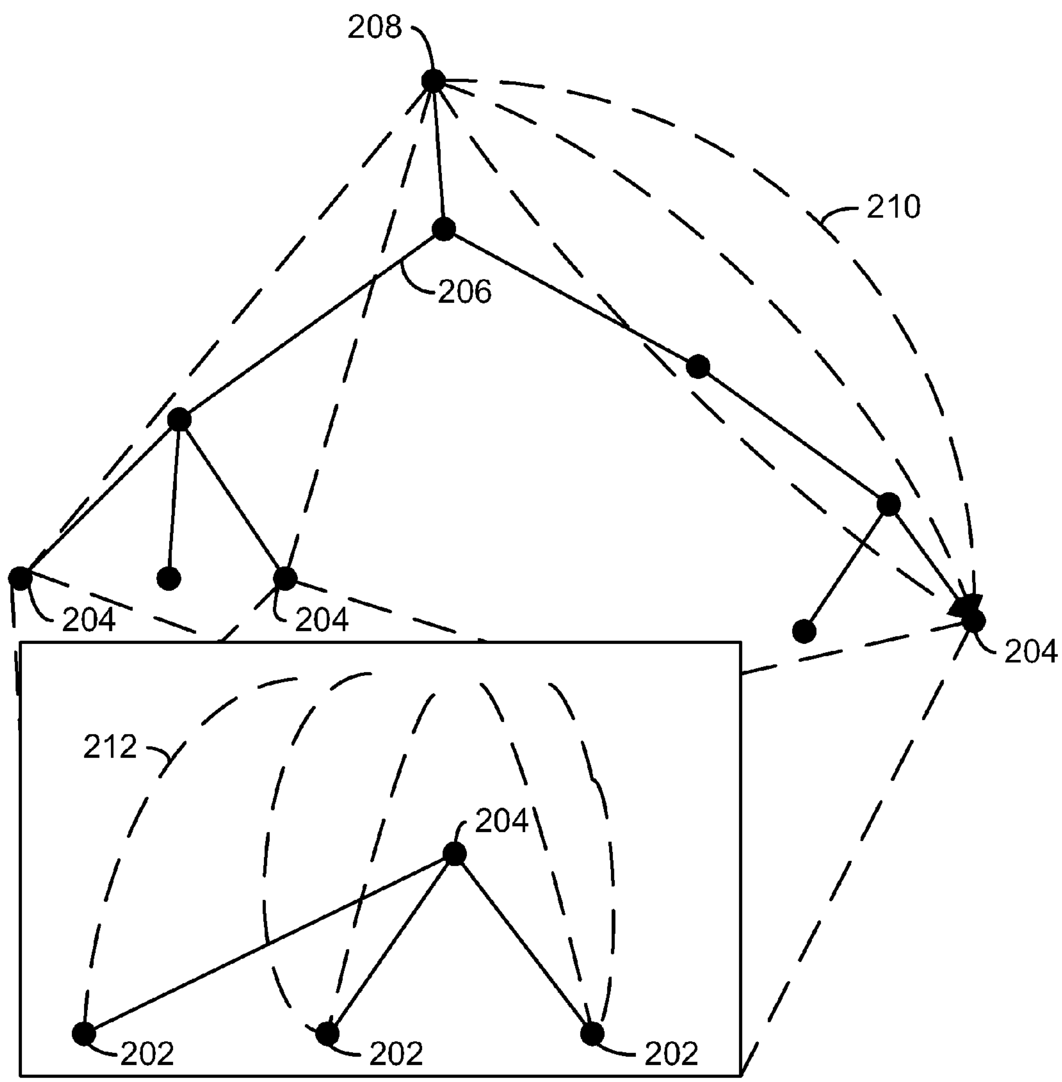
FIG. 2 is a block diagram showing a construction of bucket leaves at one or more cold servers within a tree of the data center network.

FIG. 2 is a block diagram 200 showing a construction of bucket leaves 202 at one or more cold servers 204 within a tree 206 of the data center network 102. Like numbered items are as described with respect to FIG. 1. As shown in FIG. 2, the tree 206 may be rooted at a hot server 208, with the edges of the data center network 102 being directed away from the hot server 2108. All other leaves of the tree 206 may be considered to be the cold servers.

A number of specific cold servers 204 may be selected for the VM migration procedure. Any number of VMs, or jobs, may be migrated from the hot server 208 to any of the selected cold servers 204, as indicated by dotted lines 210. Further, each of the cold servers 204 may be split into a number of bucket leaves 202 according to the procedure described above. The incoming VMs at each cold server 204 may then be distributed among the bucket leaves 202, as indicated by dotted lines 212.

By construction of the multiflow problem, the fractional solution ($x^*$,$z^*$) immediately yields a feasible flow in T*, fractionally migrating the same amount for each job. In other words, there is a multiflow in T* which routes $x^*(jk)$ of each job j to each server k. In addition, for the phase 2 LP relaxation, any integral solution to the multiflow problem on the expanded directed tree T* corresponds to a migration for which exactly one job edge is chosen incident to each $j\in V_J$, the number of job edges crossing e is at most $c_e$ for each edge $e\in T$, and $\Sigma_{f\in M\cap\delta_H(k)} l_f \leq L_k + l_{max}$.

Let M denote the set of jobs migrated in a feasible integral flow on T*, where M can choose at most one job edge, i.e., job, from any bucket $B_i$ to migrate to k. Moreover, for i>1, the size of any job in $B_i$ is at most the size of any job in $B_{i-1}$. Thus, if such a job edge is chosen, its load on server k does not exceed the fractional load induced by job edges in $B_{i-1}$. This occurs because the total fractional load induced by edges in $B_{i-1}$ is $\Sigma_{\in B_{i-1}} x^*(f) l_f$, and this sum is at least the smallest load of a job in $B_{i-1}$, which is as large as any job in $B_i$. Thus, the collective load of jobs chosen from bins $B_2, B_3, \ldots, B_{[f(k)]}$ is upper bounded by the fractional load of ($x^*$,$z^*$) on k, which is at most $L_k$. Adding one more job from $B_1$ can thus exceed $L_k$ by $l_{max}$ at most.

Multiflow problems on directed trees have a specific structure. Namely, let A be the {0,1} matrix whose rows are indexed by directed edges of T*, and whose columns are indexed by directed paths associated with job edges $E_{job}$, where the paths are extended from job nodes to bucket leaves. For a job edge $f=(j, k_r)$, where $k_r$ denotes some leaf bucket node of cold server k, a 1 is added in row e and column f precisely if e is a directed arc on the path in T* from j to $k_r$. The resulting matrix A is a network matrix and, hence, is totally unimodular, i.e., the determinant of every square submatrix is in {−1,0,1}. It follows that, if $\max w^T y$: $Ay\leq b$, $1\geq y\geq 0$ has a fractional solution for some integral capacities $b:E(T^*)\rightarrow Z_+$, then it has an integral basic optimal solution. Since the original solution $(x^*,z^*)$ induces a feasible fractional solution for the multiflow problem on T*, by taking w=l, an integral solution whose objective value is at least $\Sigma_j l_j z^*_j$ is obtained.

Relieving Multiple Hot Servers

Embodiments described herein may also be used to relieve multiple hotspots on multiple hot servers within the data center network 102. A multiserver LP may be used to model hotspot relief of multiple hot servers. In particular, the hot server's value, opt, is an upper bound on the number of hot servers that can be relieved. In this way, the LP may be used within a heuristic to find a specific, e.g., constant factor of opt, number of servers which can be relieved.

The case where the underlying migration tree has no orientation conflicts may be considered. In other words, each edge of the tree has a direction, and job migrations jk for pairs are only allowed where the path from j to k traverses the edge in the right direction. This generalizes the single hot server case, since in the single hot server case all paths are directed away from the hot server h. The techniques used to convert a single hotspot fractional migration into an integral migration apply in a very similar fashion.

An LP relaxation for multiple hot server migration is introduced. The LP relaxation has the variables x(jk) and $z_j$ as before, but a variable $m_h \in [0,1]$ is also incorporated for each hot server $h \in \mathcal{K}_{hot}$. This variable measures the fractional extent to which the overload of $L_h$ is reduced at this server. The constraint $\Sigma_{j \in Loc(h)} z_j l_j \geq m_h L_h$ and $0 \leq m_h \leq 1$ is also introduced, wherein Loc(h) is the set of jobs on server h available for migration. The expanded LP is then solved with a new objective of $\Sigma_{h \in \mathcal{K}_{hot}} m_h$. Note that, if opt is the optimal value, then it is an upper bound on the total number of hot servers that can be relieved in one round.

Ideally, a solution to the LP is converted into a valid integral solution which relieves a constant factor Ω(opt) of servers, with some minimal violation of load constraints at cold servers. However, there are several obstacles to this approach. The first issue is whether the total unimodular structure is still inherited, which may be the case for directed trees. The second issue is that the objective function now uses variables $m_h$, and these no longer correspond to variables associated with the TUM matrix, i.e., $z_j$ or x(jk) variables. To address this issue, partial overload reduction may be employed. Finally, the problem is an all-or-nothing type of problem, i.e., either a hot server is completely relieved, or it is not. However, the multiserver LP may return solutions in which a large number of $m_h$'s have a very small value, whereas an all-or-nothing subset where the $m_h$'s are all equal to 1 is to be found.

It may be assumed that a solution $m^*_h$, $z^*_j$, x*(jk) exists for the multiserver LP on a directed tree T. It is convenient to work with an all-or-nothing solution. That is, a solution where the $m^*_h$ variables belong to {0,1}, but not necessarily the migration variables x*(jk) themselves. This sub-problem may be viewed as arising as follows by generalizing the single server case. A collection $\mathcal{H}$ of hot servers is given. The multiserver LP is to be solved. Either it succeeds to set each $m^*_h$: $h \in \mathcal{H}$ to 1, or the set that was chosen may be determined to be unable to be migrated. Thus, let $\mathcal{H}$ be a set of hot servers which have been fractionally relieved by the multiserver LP, and let opt=|$\mathcal{H}$|. A server h is β-relieved if a total load of at least $\beta L_h$ is relieved.

A fractional migration of value opt may be given such that the support of the vector $(m_h)$ has size at most α opt. Then, in polynomial-time, the solution may be converted into an integral migration which β-relieves at least $$\frac{1-2\alpha\beta}{4}$$

opt servers. In particular, an all-or-nothing migration of opt servers can be converted into an integral migration which β-relieves at least $$\frac{1-2\beta}{4}$$

opt servers.

The problem may be converted to a TUM path packing problem on a directed tree. However, in the phase 2 LP, the variables $m_h$ may not be used, since they do not correspond to subpaths within the tree. Instead, the proxy for $m_h$ shown below in Eq. 6 may be used.

$$\text{proxy}(h) = \sum_{j \in Loc(h)} z_j \frac{\ell_j}{L_h} \qquad \text{Eq. 6}$$

Thus, without loss of generality, in the multiserver LP, the above sum satisfies Eq. 7.

$$\text{proxy}(h) \leq 1 + \frac{\ell_{max}}{L_h}. \qquad \text{Eq. 7}$$

The above corresponds to not migrating a total load of more than $L_h + l_{max}$ from h. In the phase 2 TUM problem, $$\sum_h \text{proxy}(h) = \sum_h \sum_j z_j \frac{l_j}{L_h}$$

is maximized.

In addition, leaf splitting is performed at every cold server, as in the single hot server case. The bucketing of jobs at a server k is oblivious to the hot server from which the job originated. Bucketing may also be performed at each hot server h in order to ensure $$\sum_j z_j \frac{\ell_j}{L_h} \leq 2$$

in the final solution. This may be viewed as bucketing with job sizes $l'_j = l_j / L_h$, or as bucketing the $l_j$'s so that the total load of migrated jobs is at most $L_h + l_{max}$. Either way, the proxy $$(h) \leq 1 + \frac{2\ell_{max}}{L_h},$$

where Eq. 7 has been used. A caveat is that a few of the jobs may get assigned to two buckets, and allowing both would destroy the tree structure. To resolve this, a job is assigned to the bucket where most of its flow, in terms of x*(jk) values, was assigned. This could reduce its flow and, hence, the $m_h$ values up to ½. Hence, a solution of value opt/2 is transferred to the phase 2 LP.

After solving for a basic solution to the phase 2 LP by total unimodularity, an integral solution whose proxy objective is at least opt/2 is obtained. The number of servers that are β-relieved may be referred to as X, and the number of servers that are not β-relieved may be referred to as Y. Since $|X+Y|\leq\alpha opt$, $|Y|\leq\alpha opt$ is obtained. Each server in X may contribute, at most, 2 to the proxy objective due to hot server splitting. Thus, the others contribute, at most, β. Hence, $2X+\beta Y\geq opt/2$ and $X\geq(opt/2-\beta Y)/2$. Since $|Y|\leq\alpha opt$, this is at least $$\frac{1-2\alpha\beta}{4}$$

opt. If the original solution was an all-or-nothing solution, then $\alpha=1$.

In various embodiments, migration conflicts may be controlled on T. This can be controlled when the tree topology has some bounded depth D. In particular, a method is described which converts an LP solution of value opt into a no-conflict solution of value at least $$\frac{opt}{4D}.$$

For each edge of the tree, an orientation is selected, and all migrations disagreeing with the orientation are dropped. At the lowest level of the tree, there are stars centered at some node v with children $s_1$, $s_2$, $s_{d(v)}$. At this level, there is no decision. If $s_i$ is hot, its edge may be oriented towards v. Otherwise, its edge may be oriented downwards from v. However, if u is v's parent, and if orientation from v to u is selected to make a directed arc (v,u), then all migrations are lost to cold children of v, from hot servers which are not children.

To do this conversion without losing too much fractional flow, each migration from server j to k may be classified according to the level of the least common ancestor of j, k. For example, levels may be counted from the top starting at 0. Some edges have already been oriented so that all level 1 migrations are valid. Among the remaining levels 2, 3, . . . , D, the one whose migrations contribute the most to the LP opt is chosen. Some level l>1 contributes at least 1/(D−1) fraction. The edges are oriented such that ¼ of these migrations are retained. To see this, let $v_1$, $v_2$, . . . be the nodes at level l. The subtrees rooted at these nodes are disjoint, so they may be processed one by one. If $v_1$ is considered, let $c_1$, $c_2$, $c_N$ be the level 1 children of $v_1$ (recall edges out of $c_i$ are already oriented). Each $c_i$ has some hot servers and some cold servers. For each i, j, let $w_{ij}$ be the total weight of jobs migrating from hot serves which are children of $c_i$ to cold servers which are children of $c_j$. The goal is to find some subset A of $c_i$'s, and then orient the paths from each $c_i$: $i\in A$ up towards $v_1$ and orient paths from $v_1$ to each $c_i$:$i\in A$ downwards. If this is achieved, a total LP profit of $\Sigma_{i\in A,j\in A}w_{ij}$ may be retained.

A directed maximum cut problem may be solved on a complete graph H with node set $\{c_i\}_{i=1}^{N}$. There may be a cut, A, whose weight is at least $$\frac{1}{4}\sum_{i,j} w_{ij}.$$

Ignoring all orientations, a max-cut in the undirected sense is found. A cut A which is locally optimal may be selected. For each node $c_i\in A$, move $c_i$ from A to VH−A, then $\delta_H(A)=\Sigma_{i\in A,j\in A}(w_{ij}+w_{ji})$ does not increase. Similarly, moving any node from VH−A to A does not increase the size of the cut. For any $c_i$, let $d_{cut}(c_i)$ denote the total weight of edges in the cut which touch $c_i$, and $d_{nocut}(c_i)$ be the total weight of edges touching $c_i$ that are not in the cut. Then local optimal just says $d_{cut}(c_i)\geq d_{nocut}(c_i)$. On the other hand, the total weight W of all edges is just $$\frac{1}{2}\sum_{i}(d_{cut}(c_i)+d_{nocut}(c_i))$$

and by local optimality this is at most $$\frac{1}{2}\sum_{i}2d_{cut}(c_i),$$

which is 2 times the weight of the cut. Hence, the weight of a local optimal cut is a least W/2. However, if δ(A) is this cut, it is possible to orient to get all migrations from A to VH−A, or all from VH−A to A. One of these may return the result W/4. Hence, after orienting in this manner, $$\frac{1}{4(D-1)}$$

of the LP profit may be achieved.

The algorithmic approach described above may be employed within an iterative heuristic for mitigating hotspots across the data center. The hotspot overloads may be addressed in racks, one by one. The condition that migrations on each tree edge are to be consistent, i.e., all in the same direction, is automatically satisfied for migrations from one rack. Each server is a child of some rack node that is either hot, cold, or neither. Hence, direction of migration along such a leaf edge may be determined upwards from a hot server, or downwards to a cold server. Moreover, any migrations beyond this rack are obviously all oriented away from the rack node. Thus, each rack has the appropriate structure to apply the VM migration techniques described herein. The Phase 1 LP may be applied. If it does not fractionally relieve all hot servers on the rack, a binary-search-like routine may be used to try to relieve some smaller set, e.g., half of them. Once an all-or-nothing fractional migration has been found, the Phase 2 LP may be created. The second optimization yields feasible integral migrations, which are added to a batch scheduling of jobs to be migrated. The tree capacities and server CPU load capacities used by this migration may be updated, and a new rack may be selected. This process may be repeated as long as the batch of scheduled jobs can be migrated within some target delay, e.g., a 1 hour delay.

Figure 3:
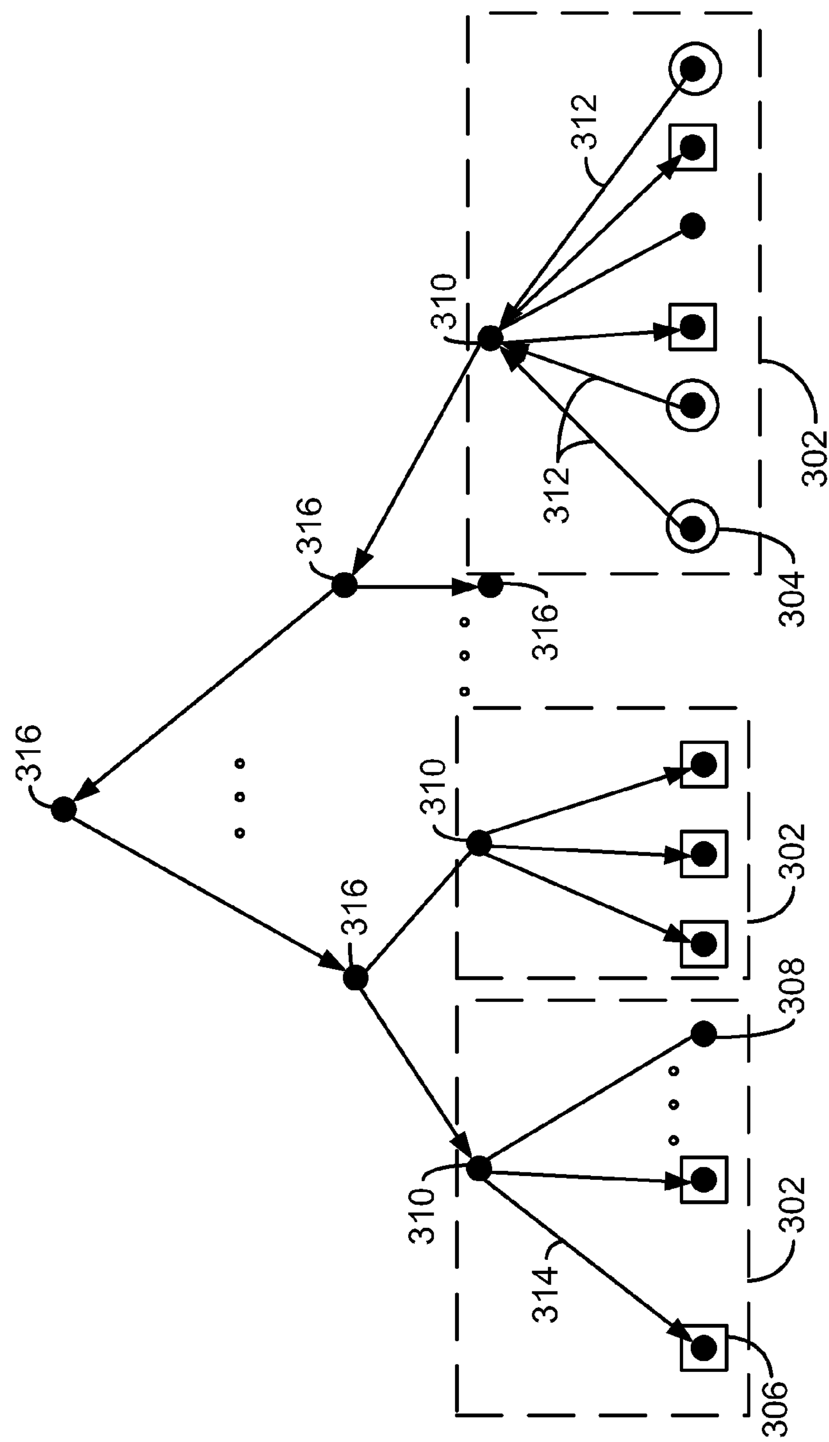
FIG. 3 is a block diagram showing an orientation of a tree for a fixed rack.

FIG. 3 is a block diagram 300 showing an orientation of a tree for a fixed rack. As shown, each rack 302 may include any number of hot servers 304 and any number of cold servers 306, and servers 308 that are neither hot nor cold. Each rack 302 may include a corresponding rack node 310. VM migration may be executed within each rack 302. More specifically, VMs may be migrated upwards from the hot servers 304 to the rack node 310, as indicated by arrow 312. In addition, VMs may be migrated downwards to any of the cold servers 306 from the rack node 310, as indicated by arrow 314. Further, if migrations within the rack 302 are not feasible, the VM migrations may be executed for any number of other nodes 316 outside of the rack 302.

In various embodiments, the following code fragment may be used to execute the phase 1 LP:

```
Input: Tree Topology T, C the set of cold servers
J the set of jobs on the hot server
For each j ∈ J, T(j) is the set of possible cold servers
Output: For each j ∈ J, k ∈ C migration variable x(jk)
total-migration variable z_j = Σ_{k∈(j)} x(jk)
z_j is for ease; expresses the amount of job j migrated in the LP
LP Objective: OPT_{LP1} = maxΣ_{j∈j} l_j z_j
Subject to
for each job j, migration constraint do
Σ_{k∈T(j)} x(jk) ≤ 1
end
for each edge e ∈ T, capacity constraint do
    Σ_{jk∈Fund(e)} x(jk) ≤ c_e
end
for each edge e ∈ T, capacity constraint do
Σ_{j:k∈T(j)} x(jk)l_j ≤ L_k
end
for each job j, its total migration variable do
z_j = Σ_{k∈T(j)} x(jk)
end
x(jk), z_j ≥ 0
```

Let $x^*(jk)$, $z_j^*$ be an optimal solution. If $\Sigma_j z_j^* l_j < L$, then it is not feasible to relieve the hot server. Otherwise, the Phase 2 LP may be solved.

In the multiserver case, the Phase 1 LP may be adapted slightly. Jobs may be incorporated from many servers for the edge capacity constraints on T. If e=(u,v) is an oriented edge of the tree, let $T_u$ denote the subtree containing u after e is deleted. Similarly, define $T_v$. For each job j at some hot server in $T_u$, and cold server $k \in T_v$, a migration variable x(jk) may be included. If Fund (e) denotes the set of all such pairs, then the capacity constraint can again be written as $\Sigma_{jk \in Fund(e)} x(jk) \leq c_e$. The multiserver LP also has a new objective function, which is $\max \Sigma_h m_h$, where for each hot server h: $0 \leq m_h \leq 1$, and the constraint $m_h - \Sigma_{j \in Loc(h),k} x(jk) l_j / L_h \leq 0$ is added. Although this may be written under the assumption that all x(jk) migration variables are possible, destination sets T(j) may be used to force some of these to 0, for instance, if jk migrates the wrong way on an edge.

In various embodiments, the following code fragment is used to execute the phase 2 LP:

```
Input: Phase 1 solution x*(jk) for each job j, cold server k ∈ T(j)
Output: For each j ∈ J, k ∈ C with x*(jk) > 0, an integer migration
variable x(jk) total-migration variable z_j = Σ_k x(jk)
LP Objective: OPT_{LP1} = max Σ_{j∈j} l_j z_j
Subject to
for each job k ∈ C, add simulated load constraints as follows do
    Order jobs j with x*(jk) > 0 in decreasing load size:
    l_1 ≥ l_2 ≥ ••• ≥ l_p
    f_k ← Σ_{j∈J} x*(jk) ("fractional degree" of server k)
    f_k^+ ← [f_k]        (rounded up degree)
    for i = 1,2 ..., f_k^+ − 1 do
        o_i ← min{s: Σ_{j=1}^s x*(jk) ≥ i} (first point where sum of job
        flows reach i)
    end
        o_{f_k^+} ← p, o_0 ← 1
    for i = 1,2, ..., f_k^+ do
```

-continued

```
        B_i ← {j:j = o_{i−1}, o_{i−1} + 1, ..., o_i} (define Bucket i)
        Σ_{j∈B_i} x(jk) ≤ 1 bucket constraint to simulate load at k
    end
end
Add capacity and migration constraints as in Phase 1 LP
x(jk), z_j ≥ 0
```

If a simplex solver is used, the result may be integral, i.e., x(jk) may be 0-1 valued. The result may specify which jobs to migrate to relieve the hot server.

For the multiserver LP, the $m_h$ variables may no longer be used in a merely total unimodular formulation. Instead, the $m_h$ variables may be dropped, and the proxy objective function shown below in Eq. 8 may be optimized.

$$\max \sum_h \sum_{j \in Loc(h),k} x(jk) \frac{l_j}{L_h} \quad \text{Eq. 8}$$

In addition, buckets may be added at the hot servers so that the hot servers are not over-relieved. Bucketing at h is done in the same manner as for a cold server, except that a job may be disallowed from going to more than one bucket. The loads $l_1 \geq l_2 \ldots$ of jobs which were partially migrated in Phase 1 may be ordered. The jobs may be iteratively collected into buckets of total flow 1 as before. If a job has been assigned to two buckets, it may only be assigned to the bucket to which the majority of its flow was sent.

Method for Migrating Processes

Figure 4:
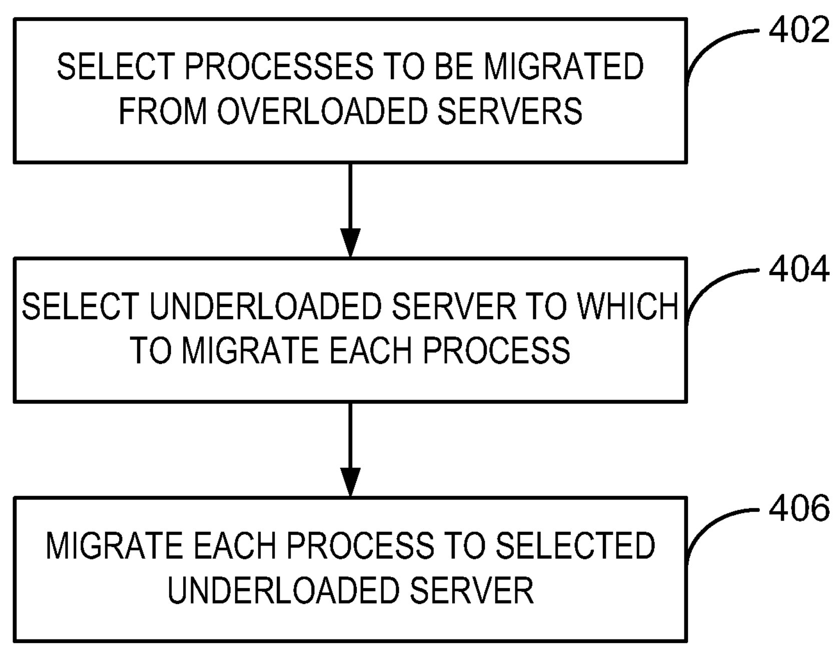
FIG. 4 is a process flow diagram of a method for migrating processes in a data center network.

FIG. 4 is a process flow diagram of a method 400 for migrating processes in a data center network. In various embodiments, the processes that are migrated according to the method 400 are virtual machines. The method 400 may be used to alleviate hotspots, while sustaining the migration delay within certain time boundaries. The method 400 may leverage the cloud monitoring infrastructure of a data center network to track the dynamic loads of servers and processes, which may be used to detect hotspots. In addition, the method 400 may be used to compute a new mapping of the processes within the data center network, to optimize costs and balance loads. The method 400 may also be used to actuate the migration decisions, and incorporate prioritization of migrations to ensure that access to specific resources is maintained. This may enable maintenance and energy-saving operations.

In various embodiments, the data center network used according to the method 400 is the data center network 102 discussed above with respect to FIG. 1. In addition, the process migration procedure may be executed for processes, e.g., VMs, within any of the servers 104 within the data center network 102. In various embodiments, a server 104 is considered to be overloaded, or hot, if its utilization is above a specified upper threshold value, and a server 104 is considered to be underloaded, or cold, if its utilization is below a specified lower threshold value.

In some embodiments, the method 400 is executed by a client computing device that is communicably coupled to the data center network. In other embodiments, the method 400 is executed automatically by the data center network itself.

The method begins at block 402 with the selection of a number of processes to be migrated from any of a number of overloaded servers within the data center network. In various embodiments, the processes are selected simultaneously. The processes may be selected such that a maximum number of overloaded servers are relieved. The processes may be selected based on an overload status of each corresponding overloaded server. The overload status may be based on the excess capacity or the number of hotspots associated with the overloaded server hosting the process. For example, a process may be selected from a particular server if the excess capacity of the server is greater than the excess capacity of the remaining servers, or the number of hotspots of the server is greater than the number of hotspots of the remaining servers. In some embodiments, the processes are determined on a rack by rack basis. In addition, the processes may be selected based on parameters of network components. The network components may include network links or network devices, or both. For example, the processes may be selected based on available capacities for network links by which the selected processes are to be migrated. The available capacity for a network link may be equal to a specified available bandwidth for the network link. In some embodiments, the available capacity for a network link is set to a static value, e.g., 1 Gbps. In other embodiments, the available capacity is determined according to the bandwidth that is allocated for process migration as background traffic. This may prevent the VM migration procedure from interfering with foreground application traffic.

At block 404, for each process, an appropriate underloaded server to which to migrate the process is selected. Each underloaded server may be selected based on an underload status indicating how underloaded the server is. The underload status may be based on the free capacity of the underloaded server. In addition, each underloaded server may be selected based on available resources and constraints in the data center network. For example, underloaded servers may be selected based on network distances and parameters between each of the underloaded servers and an overloaded server including a selected process. The selection of an underloaded server for a particular process may also be limited to underloaded servers that are within a specified network proximity to the overloaded server hosting the process. In various embodiments, the underloaded servers to which to migrate the processes are selected simultaneously. In addition, the underloaded servers may be selected based on available capacities for network links by which the selected processes are to be migrated to the underloaded servers. As discussed above, the available capacity for a network link may be equal to a specified available bandwidth for the network link.

According to embodiments described herein, the processes to be migrated and the underloaded servers to which to migrate the processes are selected simultaneously. In other words, the overloaded servers including the processes and the underloaded servers to which the processes are to be migrated are simultaneously determined according to the method 400. This may be accomplished by solving an LP optimization problem that produces a fractional solution, as well as a second LP problem that rounds the fractional solution.

At block 406, each process is migrated to the selected underloaded server within the data center network. The processes may be migrated such that a migration finishes within a specified budget. The specified budget may be a temporal budget or a bandwidth budget. In addition, the specified budget may be a specified absolute total number of processes for migration, or a specified maximum number of processes that can be migrated from each overloaded server, or to each underloaded server. For example, if the budget is a temporal budget, the processes may be migrated such that the all of the processes have been migrated within a specified time period. In some embodiments, the processes are migrated such that the capacities for the network links are not exceeded. The processes may be prioritized based on the application to which each process belongs. In addition, processes may be prioritized based on a use of each corresponding overloaded server hosting the processes. Further, two processes of the same application may not be migrated to underloaded servers that are located in the same rack to avoid a single point of failure.

In various embodiments, both a local state and a persistent state of a process are migrated to an underloaded server concurrently. In other embodiments, the local state of the process is migrated to the underloaded server, and then the underloaded server accesses a storage system of the data center network to obtain the persistent state of the process.

The method 400 is not intended to indicate that the steps of the method 400 are to be executed in any particular order, or that all of the steps of the method 400 are to be included in every case. Further, any number of additional steps may be included within the method 400, depending on the specific application. For example, the method 400 may be executed in response to one or more failure events, or faults, within the data center network. Thus, the method 400 may provide fault tolerance for the data center network.

Computing Environment

Figure 5:
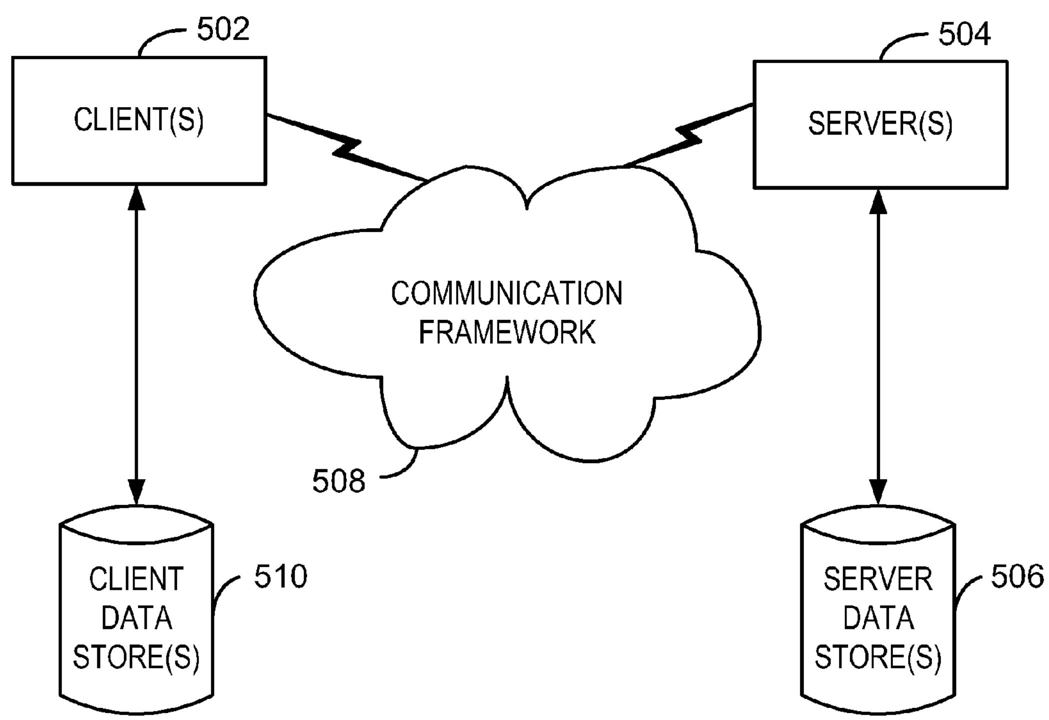
FIG. 5 is a block diagram of a networking environment in which a system and method for migrating processes may be implemented.
Figure 6:
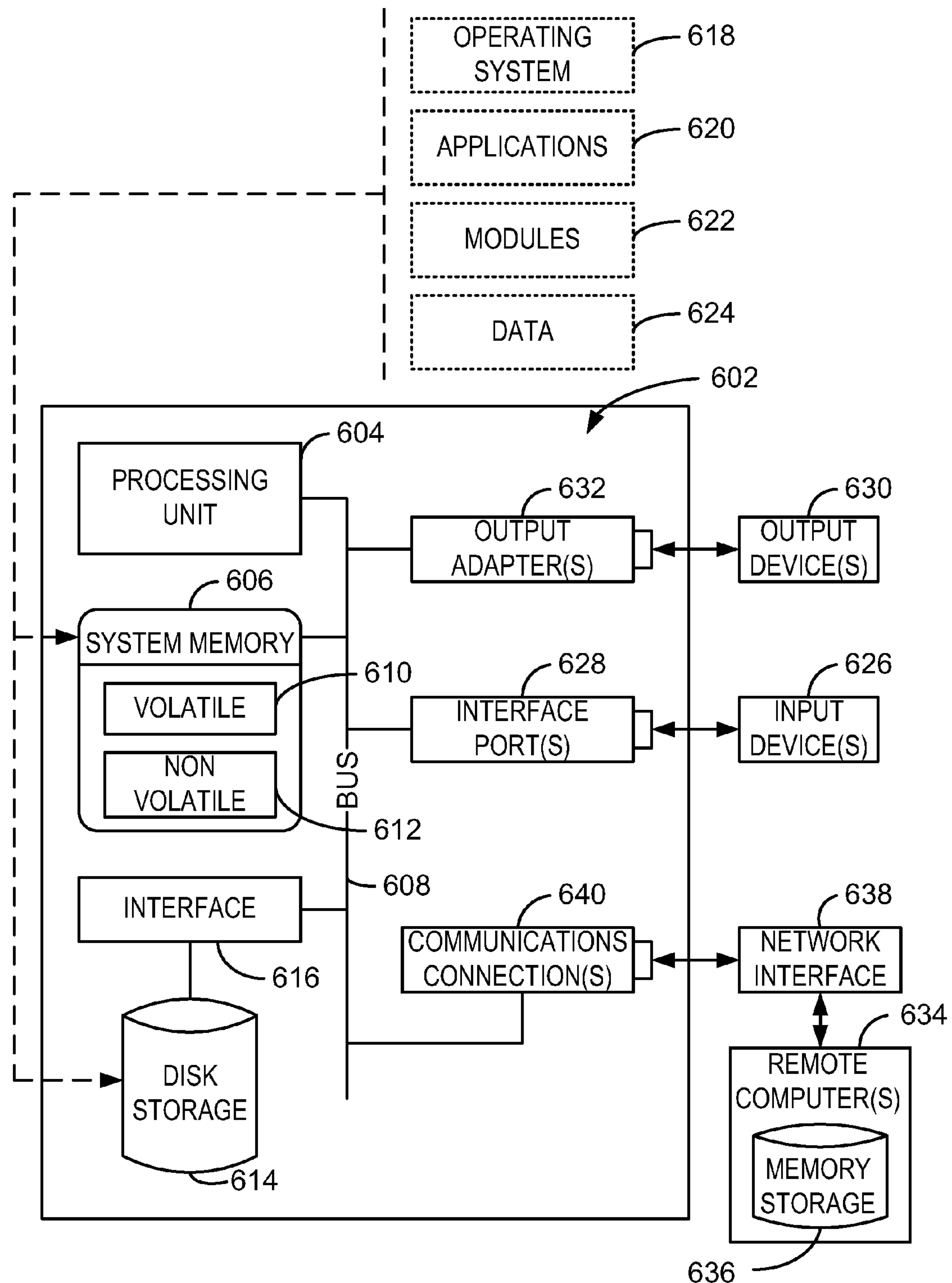
FIG. 6 is a block diagram of a computing environment that may be used to implement a system and method for migrating processes.

In order to provide additional context for implementing various aspects of the claimed subject matter, FIGS. 5-6 and the following discussion are intended to provide a brief, general description of a suitable computing environment in which the various aspects of the subject innovation may be implemented. For example, a method and system for process migration in data center networks can be implemented in such a suitable computing environment. While the claimed subject matter has been described above in the general context of computer-executable instructions of a computer program that runs on a local computer or remote computer, those of skill in the art will recognize that the subject innovation also may be implemented in combination with other program modules. Generally, program modules include routines, programs, components, data structures, etc., that perform particular tasks or implement particular abstract data types.

Moreover, those of skill in the art will appreciate that the subject innovation may be practiced with other computer system configurations, including single-processor or multiprocessor computer systems, minicomputers, mainframe computers, as well as personal computers, hand-held computing devices, microprocessor-based or programmable consumer electronics, and the like, each of which may operatively communicate with one or more associated devices. The illustrated aspects of the claimed subject matter may also be practiced in distributed computing environments wherein certain tasks are performed by remote processing devices that are linked through a communications network. However, some, if not all, aspects of the subject innovation may be practiced on stand-alone computers. In a distributed computing environment, program modules may be located in local or remote memory storage devices.

FIG. 5 is a block diagram of a networking environment 500 in which a system and method for migrating processes may be implemented. The networking environment 500 includes one or more client(s) 502. The client(s) 502 can be hardware and/or software (e.g., threads, processes, or computing devices). The networking environment 500 also includes one or more server(s) 504. The server(s) 504 can be hardware and/or software (e.g., threads, processes, or computing devices). The servers 504 can house threads to perform search operations by employing the subject innovation, for example.

One possible communication between a client 502 and a server 504 can be in the form of a data packet adapted to be transmitted between two or more computer processes. The networking environment 500 includes a communication framework 508 that can be employed to facilitate communications between the client(s) 502 and the server(s) 504. The client(s) 502 are operably connected to one or more client data store(s) 510 that can be employed to store information local to the client(s) 502. The client data store(s) 510 may be stored in the client(s) 502, or may be located remotely, such as in a cloud server. Similarly, the server(s) 504 are operably connected to one or more server data store(s) 506 that can be employed to store information local to the servers 504.

FIG. 6 is a block diagram of a computing environment 600 that may be used to implement a system and method for migrating processes. The computing environment 600 includes a computer 602. The computer 602 includes a processing unit 604, a system memory 606, and a system bus 608. The system bus 608 couples system components including, but not limited to, the system memory 606 to the processing unit 604. The processing unit 604 can be any of various available processors. Dual microprocessors and other multiprocessor architectures also can be employed as the processing unit 604.

The system bus 608 can be any of several types of bus structures, including the memory bus or memory controller, a peripheral bus or external bus, or a local bus using any variety of available bus architectures known to those of ordinary skill in the art. The system memory 606 is computer-readable media that includes volatile memory 610 and nonvolatile memory 612. Various systems or interfaces may be used containing the basic routines to transfer information between elements within the computer 602, such as during start-up. For example, the basic input/output system (BIOS), is stored in nonvolatile memory 612. In another example, an extensible firmware interface (EFI) may be used. By way of illustration, and not limitation, nonvolatile memory 612 can include read-only memory (ROM), programmable ROM (PROM), electrically-programmable ROM (EPROM), electrically-erasable programmable ROM (EEPROM), or flash memory.

Volatile memory 610 includes random access memory (RAM), which acts as external cache memory. By way of illustration and not limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 602 also includes other computer-readable media, such as removable/non-removable, volatile/non-volatile computer storage media. FIG. 6 shows, for example, a disk storage 614. Disk storage 614 includes, but is not limited to, devices like a magnetic disk drive, floppy disk drive, tape drive, Jaz drive, Zip drive, LS-100 drive, flash memory card, or memory stick.

In addition, disk storage 614 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 614 to the system bus 608, a removable or non-removable interface is typically used, such as interface 616.

It is to be appreciated that FIG. 6 describes software that acts as an intermediary between users and the basic computer resources described in the computing environment 600. Such software includes an operating system 618. Operating system 618, which can be stored on disk storage 614, acts to control and allocate resources of the computer 602.

System applications 620 take advantage of the management of resources by operating system 618 through program modules 622 and program data 624 stored either in system memory 606 or on disk storage 614. It is to be appreciated that the claimed subject matter can be implemented with various operating systems or combinations of operating systems.

A user enters commands or information into the computer 602 through input devices 626. Input devices 626 include, but are not limited to, a pointing device (such as a mouse, trackball, stylus, or the like), a keyboard, a microphone, a joystick, a satellite dish, a scanner, a TV tuner card, a digital camera, a digital video camera, a web camera, or the like. The input devices 626 connect to the processing unit 604 through the system bus 608 via interface port(s) 628. Interface port(s) 628 include, for example, a serial port, a parallel port, a game port, and a universal serial bus (USB). Output device(s) 630 may also use the same types of ports as input device(s) 626. Thus, for example, a USB port may be used to provide input to the computer 602, and to output information from computer 602 to an output device 630.

Output adapter 632 is provided to illustrate that there are some output devices 630 like monitors, speakers, and printers, among other output devices 630, which are accessible via adapters. The output adapters 632 include, by way of illustration and not limitation, video and sound cards that provide a means of connection between the output device 630 and the system bus 608. It can be noted that other devices and/or systems of devices provide both input and output capabilities, such as remote computer(s) 634.

The computer 602 can be a server hosting a search engine site in a networking environment, such as the networking environment 500, using logical connections to one or more remote computers, such as remote computer(s) 634. The remote computer(s) 634 may be client systems configured with web browsers, PC applications, mobile phone applications, and the like. The remote computer(s) 634 can be a personal computer, a server, a router, a network PC, a workstation, a microprocessor based appliance, a mobile phone, a peer device or other common network node and the like, and typically includes many or all of the elements described relative to the computer 602. For purposes of brevity, the remote computer(s) 634 is illustrated with a memory storage device 636. Remote computer(s) 634 is logically connected to the computer 602 through a network interface 638 and then physically connected via a communication connection 640.

Network interface 638 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 640 refers to the hardware/software employed to connect the network interface 638 to the system bus 608. While communication connection 640 is shown for illustrative clarity inside computer 602, it can also be external to the computer 602. The hardware/software for connection to the network interface 638 may include, for example, internal and external technologies such as, mobile phone switches, modems including regular telephone grade modems, cable modems and DSL modems, ISDN adapters, and Ethernet cards.

Some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed above, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As used herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

As used herein, terms "component," "search engine," "browser," "server," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media. As used herein, computer-readable storage media can include tangible magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Computer-readable storage media do not include transitory signals. Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for process migration in a data center network, comprising:

selecting, via a computing device, processes to be migrated from a plurality of overloaded servers within a data center network based on an overload status of each overloaded server;

selecting, via the computing device, for each selected process, one of a plurality of underloaded servers to which to migrate the selected process based on an underload status of each underloaded server, and based on available capacities for network links by which the selected process is to be migrated, wherein the process to be migrated and the underloaded server to which to migrate the process are selected simultaneously by performing a first linear programming relaxation to produce a fractional solution and a second linear programming relaxation on the fractional solution to produce an integral solution; and migrating, via the computing device, each selected process to the selected underloaded server based on the integral solution such that a migration finishes within a specified budget of time.

2. The method of claim 1, wherein the overload status comprises an excess capacity of a selected overloaded server, and wherein the underload status comprises a free capacity of a selected underloaded server.

3. The method of claim 1, comprising selecting the processes to be migrated such that a maximum number of overloaded servers are relieved.

4. The method of claim 1, comprising determining an order of migrating the processes by prioritizing the processes based on an application to which each process belongs.

5. The method of claim 1, wherein selecting one of the plurality of underloaded servers to which to migrate a selected process comprises selecting one or more of the underloaded servers within a specified network proximity to an overloaded server hosting the selected process.

6. A system for process migration, comprising:

a data center network comprising a plurality of servers, wherein the plurality of servers comprises overloaded servers and underloaded servers; and a client computing device communicatively coupled to the data center network, wherein the client computing device comprises:

a processor that is adapted to execute stored instructions; and a system memory, wherein the system memory comprises code configured to:

select processes to be migrated from one of the overloaded servers based on an overload status of each overloaded server; and select, for each selected process, an underloaded server to which to migrate the selected process based on an underload status of each underloaded server, and based on available resources and constraints in the data center network for migrating the selected process to the underloaded server, wherein the process to be migrated and the underloaded server to which to migrate the process are to be selected simultaneously by performing a first linear programming relaxation to produce a fractional solution and a second linear programming relaxation on the fractional solution to produce an integral solution;

wherein the data center network is configured to migrate each selected process to the selected underloaded server based on the integral solution within a specified budget of bandwidth.

7. The system of claim 6, wherein the overload status comprises an excess capacity of a selected overloaded server, and wherein the underload status comprises a free capacity of a selected underloaded server.

8. The system of claim 6, wherein the processes comprise virtual machines.

9. The system of claim 6, wherein the data center network is configured to migrate a local state or a persistent state, or both, of a selected process to a selected underloaded server.

10. The system of claim 6, wherein the data center network is configured to migrate a local state of a selected process to a selected underloaded server, and wherein the selected underloaded server is configured to access a storage system of the data center network to obtain a persistent state of the process.

11. The system of claim 6, wherein the constraints comprise network distances and parameters between each of the underloaded servers and an overloaded server comprising a selected process.

12. One or more computer-readable storage media for storing computer-readable instructions, the computer-readable instructions providing a system for migrating processes when executed by one or more processing devices, the computer-readable instructions comprising code configured to:

select a process to be migrated from an overloaded server within a data center network, wherein the overloaded server is chosen from a plurality of overloaded servers based on an excess capacity of the overloaded server;

select an underloaded server within the data center network to which to migrate the selected process, wherein the underloaded server is chosen from a plurality of underloaded servers based on a free capacity of the underloaded server, available capacities for network links by which the selected process is migrated to the underloaded server, and a network distance between the underloaded server and the overloaded server, wherein the process to be migrated and the underloaded server to which to migrate the process are to be selected simultaneously by performing a first linear programming relaxation to produce a fractional solution and a second linear programming relaxation on the fractional solution to produce an integral solution; and migrate the selected process from the overloaded server to the underloaded server based on the integral solution within a specified budget of a number of processes.

13. The one or more computer-readable storage media of claim 12, wherein the computer-readable instructions comprise code configured to migrate each of a plurality of selected processes from any of the plurality of overloaded machines to any of the plurality of underloaded servers within a specified budget.

14. The one or more computer-readable storage media of claim 12, wherein the network distance between the underloaded server and the overloaded server is less than or equal to a specified network distance.

15. The one or more computer-readable storage media of claim 12, wherein the computer-readable instructions comprise code configured to:

select a plurality of processes to be migrated from any of a plurality of overloaded server within the data center network;

select one or more underloaded servers within the data center network to which to migrate the plurality of selected processes; and migrate the plurality of selected processes from the overloaded servers to the selected underloaded servers.

16. The one or more computer-readable storage media of claim 12, wherein the specified budget comprises a maximum number of processes that can be migrated to each underloaded server.

* * * * *